United States Patent
Kai et al.

(10) Patent No.: US 9,694,318 B2
(45) Date of Patent: Jul. 4, 2017

(54) CATALYST STRUCTURE FOR EXHAUST GAS CLEANING

(71) Applicant: MITSUBISHI HITACHI POWER SYSTEMS, LTD., Kanagawa (JP)

(72) Inventors: Keiichiro Kai, Yokohama (JP); Yasuyoshi Kato, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 20 days.

(21) Appl. No.: 14/431,903

(22) PCT Filed: Nov. 12, 2013

(86) PCT No.: PCT/JP2013/006645
§ 371 (c)(1),
(2) Date: Mar. 27, 2015

(87) PCT Pub. No.: WO2014/076938
PCT Pub. Date: May 22, 2014

(65) Prior Publication Data
US 2015/0258494 A1     Sep. 17, 2015

(30) Foreign Application Priority Data
Nov. 13, 2012  (JP) .................................. 2012-249094

(51) Int. Cl.
*B01D 50/00*   (2006.01)
*B01D 53/86*   (2006.01)
(Continued)

(52) U.S. Cl.
CPC ......... *B01D 53/8631* (2013.01); *B01D 53/88* (2013.01); *B01J 23/28* (2013.01);
(Continued)

(58) Field of Classification Search
CPC .......... B01D 225/30; B01D 2255/2092; B01D 2255/20723; B01D 53/88; B01D 2523/68; B01J 2523/47
(Continued)

(56) References Cited

U.S. PATENT DOCUMENTS
2008/0159923 A1    7/2008  Sarai et al.

FOREIGN PATENT DOCUMENTS
JP    55-152552    11/1980
JP    3-65243      3/1991
(Continued)

OTHER PUBLICATIONS

International Search Report issued Jan. 28, 2014 in International Application No. PCT/JP2013/006645.

*Primary Examiner* — Tom P Duong
(74) *Attorney, Agent, or Firm* — Wenderoth, Lind & Ponack, L.L.P.

(57) ABSTRACT

A catalyst structure for exhaust gas cleaning obtained by superimposing flat plate-like catalyst elements composed of a flat part, which is a main structural part, and a linear spacer part composed of raised strips and recessed strips so that a gas flow channel is ensured along the lengthwise direction of the spacer part, wherein the flat part has at least one baffle part composed of a leg plate erectly provided on the flat part with a height that is less than that of the spacer part with reference to the flat part, and a top plate disposed substantially parallel to the flat part from the upper end of the leg plate. Turbulence can be imparted by the baffle part to gas that flows to the gas flow channel.

6 Claims, 4 Drawing Sheets

(51) Int. Cl.
*B01D 53/88* (2006.01)
*B01J 23/28* (2006.01)

(52) U.S. Cl.
CPC ........... *B01D 2255/2092* (2013.01); *B01D 2255/20707* (2013.01); *B01D 2255/20723* (2013.01); *B01D 2255/20769* (2013.01); *B01D 2255/30* (2013.01); *B01D 2255/904* (2013.01); *B01J 2523/00* (2013.01)

(58) Field of Classification Search
USPC ................................................. 422/177, 180
See application file for complete search history.

(56) References Cited

FOREIGN PATENT DOCUMENTS

| | | | |
|---|---|---|---|
| JP | 9-10599 | | 1/1997 |
| JP | 11-226358 | | 8/1999 |
| JP | 11-226358 | * | 9/1999 |
| JP | 2002-336706 | | 11/2002 |
| JP | 2006-181442 | | 7/2006 |
| JP | 2010-253366 | | 11/2010 |
| JP | 2010253366 | * | 11/2010 |

* cited by examiner (a)

GAS →

(b)

→

(c)

→

(a)

(b)

(c)

CATALYST STRUCTURE FOR EXHAUST GAS CLEANING

TECHNICAL FIELD

The present invention relates to a catalyst structure for exhaust gas cleaning. More specifically, the present invention relates to a catalyst structure for exhaust gas cleaning which is suitably used in a denitrification apparatus for removing nitrogen oxides in a boiler exhaust gas and obtained by superimposing flat plate-like catalyst elements so as to ensure a gas flow channel.

BACKGROUND ART

Nitrogen oxides ($NO_x$) in gases discharged from thermal power plants, various kinds of factories, automobiles and the like are substances causing photochemical smog and acid rain. As a nitrogen oxide removing technology, an exhaust gas denitrification process by selective catalytic reduction reaction using ammonia ($NH_3$) as a reducing agent is known and is widely used mainly in thermal power plants and the like. Since the exhaust gas from the thermal power plants using coal and heavy oil as fuels contains a large amount of soot and dust, a denitrification catalyst becomes clogged, which is likely to incur an increase in pressure loss and a deterioration in denitrification efficiency over time. As a denitrification catalyst for exhaust gas having a high concentration of soot and dust, a parallel flow type catalyst is known. Examples of the parallel flow type catalyst include a catalyst in which plural sheets of plate-like catalyst elements are superimposed and a catalyst formed to have a honeycomb structure. Among these, the catalyst in which plural sheets of plate-like catalyst elements are superimposed has excellent mechanical strength compared to the catalyst formed to have a honeycomb structure since the plate-like catalyst elements are reinforced by a metal base or the like.

In order to improve the denitrification efficiency of the parallel flow type catalyst composed of plate-like catalyst elements, there is an attempt to provide protrusions or through-holes which impart turbulence to the flow of the exhaust gas in the plate-like catalyst elements. For example, PTL 1 discloses a unit plate-like catalyst in which plural weir-like protrusions and plural through-holes, which are complementary to the protrusions in form, are formed in a plate-like catalyst which supports a component having catalytic activity on the surface. In addition, PTL 2 discloses a structure in which plural sheets of projecting strip parts are alternately laminated at a right angle so as to impart turbulence to the flow of gas in a flow channel. Further, PTL 3 discloses that plural catalyst structures obtained by laminating plate-like catalyst elements are provided at predetermined intervals in a gas flowing direction and the direction of projecting strip parts of the plate-like catalyst elements in the catalyst structure is arranged to form a 90-degree angle with respect to the direction of projecting strip parts of the plate-like catalyst elements in the catalyst structure on a subsequent stage.

CITATION LIST

Patent Literature

[PTL 1] JP-A-9-10599
[PTL 2] JP-A-55-152552
[PTL 3] JP-A-2010-253366
[PTL 4] JP-A-3-065243

SUMMARY OF INVENTION

Technical Problem

In order to impart sufficient turbulence to the gas flow in the weir-like protrusions as described in PTL 1, the size of the weir-like protrusions needs to be increased or the number of the weir-like protrusions to be disposed needs to be increased. As a result, the pressure loss of the catalyst structure is increased and thus the denitrification efficiency is deteriorated in some cases. On the other hand, as described in PTL 2 or 3, it takes effort to laminate the raised strip parts, which become spacers, orthogonal to each other to ensure the flow channel and the productivity of the catalyst structure is deteriorated.

An object of the present invention is to provide a catalyst structure having a small pressure loss and high denitrification efficiency without deteriorating the productivity of the catalyst structure.

Solution to Problem

As a result of intensive investigations conducted by the present inventors to achieve the above object, the present invention including the following aspects has been completed.

That is, the present invention includes the following aspects.

[1] A catalyst structure for exhaust gas cleaning obtained by superimposing flat plate-like catalyst elements composed of a flat part, which is a main structural part, and a linear spacer part composed of raised strips and recessed strips so that a gas flow channel is ensured along the lengthwise direction of the spacer part, wherein the flat part has at least one baffle part composed of a leg plate erectly provided on the flat part with a height that is less than that of the spacer part with reference to the flat part, and a top plate disposed substantially parallel to the flat part from the upper end of the leg plate and turbulence can be imparted by the baffle part to gas that flows to the gas flow channel.

[2] The catalyst structure according to [1], wherein a baffle part in one plate-like catalyst element is arranged at the same position as that of a baffle part in an adjacent superimposed plate-like catalyst element as viewed from a direction normal to the flat part.

[3] The catalyst structure according to [1] or [2], wherein the direction of the baffle part in one plate-like catalyst element is the same as the direction of the baffle part in an adjacent superimposed plate-like catalyst element.

[4] The catalyst structure according to [1] or [2], wherein the direction of the baffle part in one plate-like catalyst element is opposite to the direction of the baffle part in an adjacent superimposed plate-like catalyst element.

[5] The catalyst structure according to any one of [1] to [4], wherein the flat part has a hole passing through the flat part from the front surface to the rear surface in a section having the baffle part.

[6] The catalyst structure according to any one of [1] to [5], wherein the height of the top plate with reference to the flat part is ⅖ to ⅗ of the height of the spacer part with reference to the flat part.

Advantageous Effects of Invention

The catalyst structure according to the present invention is capable of effectively imparting turbulence to the gas flow with a small pressure loss. As a result, the denitrification efficiency per weight of the catalyst is high. In the catalyst structure according to the present invention, when the baffle part in one plate-like catalyst element is arranged at the same position as that of the baffle part in an adjacent superimposed plate-like element as viewed from the direction normal to the flat part, turbulence can be effectively imparted to the gas flow with a small pressure loss and thus the amount of exhaust gas passing through the catalyst structure without contact with the catalyst can be significantly decreased.

When a hole passing through the flat part from the front surface to the rear surface is formed in a section having the baffle part, some of the gas colliding with the baffle part passes the through-hole and thus the pressure loss can be significantly decreased.

Since the denitrification performance can be improved with the same amount of the catalyst as in the present invention, the amount of the catalyst used can be significantly decreased. In addition, according to the exhaust gas conditions of an actual machine, the condition for disposing the baffle part can be freely set and thus it is possible to cope with a wide range of exhaust gas.

DESCRIPTION OF EMBODIMENTS

[Catalyst Element for Exhaust Gas Cleaning]

A catalyst structure for exhaust gas cleaning according to an embodiment of the present invention is formed by superimposing flat plate-like catalyst elements so as to ensure a gas flow channel.

Figure 6:
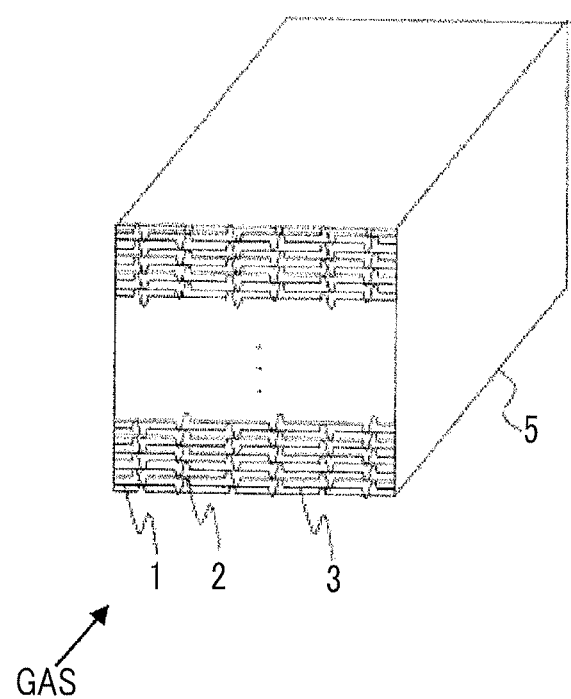
FIG. 6 is a diagram showing an example of a catalyst structure formed by laminating the plate-like catalyst elements.

A plate-like catalyst element 1 is provided with, for example, a flat part 3 which is a main structural part, and a linear spacer part 2 composed of raised strips and recessed strips. When plural sheets of the plate-like catalyst elements are superimposed, the spacer part 2 functions as a spacer for ensuring a space through which gas can pass between the elements. The cross-sectional shape of the raised strip and the recessed strip is not particularly limited. Examples thereof include the shape described in JP-A-56-33136. The spacer parts 2 having a wavy cross section composed of one raised strip and one recessed strip have high rigidity in the superimposing direction since the spacer parts are arranged with the flat part 3 of adjacent plate-like catalyst element interposed between two spacer parts having a wavy cross section when the plate-like catalyst elements are laminated as shown in FIG. 6. Even when the width or the number of the wavy parts is decreased, the shape retention properties of the catalyst structure can be maintained at a high level and thus the wavy spacer part is preferable. The spacer part 2 can be formed by subjecting a flat plate-like base to a shape bending process. The shape bending process is an operation of bending a material using a press. An interval between the wavy raised and recessed strips is preferably 20 mm to 200 mm.

In the plate-like catalyst element according to the embodiment, the flat part 3 has at least one baffle part 4. The baffle part 4 is composed of a leg plate 4b and a top plate 4a.

The leg plate 4b is erectly provided on the flat part 3. The direction of the plate surface of the leg plate is not parallel to the spacer part in the lengthwise direction and is preferably orthogonal to the spacer part. The plate surface of the leg plate may be erectly provided perpendicular to the flat part (refer to FIG. 4(a)) and may be erectly provided to be inclined to the flat part (refer to FIG. 4(b)). From the viewpoint of a small pressure loss, as shown in FIG. 4(b), it is preferable that the leg plate is erectly provided to be inclined to the flat part. The leg plate can be erectly provided to be directed upward or downward from the flat part. The leg plates may be erectly provided to be alternately directed upward and downward.

The height h' of the leg plate is less than that of the spacer part with reference to the flat part, preferably ⅖ to ⅗ of the height of the spacer part with reference to the flat part, and more preferably ½ of the height of the spacer part with reference to the flat part. By the height of the spacer part, the width of the gas flow channel, that is, the distance h between the flat parts obtained when the plate-like catalyst elements are superimposed is substantially determined. By the height of the leg plate, the distance between the top plate and the flat part is substantially determined. In the present invention, the top plate 4a is preferably arranged in the middle (h/2 height) of the flow channel formed between the flat parts of the superimposed catalyst elements.

The top plate 4a is disposed substantially parallel to the flat part 3 from the upper end of the leg plate 4b. It is preferable that the top plate is disposed so as to be projected in the direction opposite to the flow. The length d projecting from the leg plate is not particularly limited but is preferably 1 time to 10 times the height of the leg plate and more preferably 1.5 times to 5 times the height of the leg plate. Specifically, the length d is 1 cm to 3 cm. When the length d is too short, as described in PTL 1, while the gas stirring effect is decreased, the pressure loss is increased. When the length d is too long, the number of the baffle parts that can be provided in one flow channel is decreased and thus a high performance improvement effect cannot be obtained.

A joint between the leg plate and the top plate and a joint between the leg plate and the flat part may be formed with an angle as shown in FIGS. 4(a) and 4(b), or may be smoothly curved as shown in FIG. 4(c). From the viewpoint of a small pressure loss, the joint is preferably curved as shown in FIG. 4(c).

Figure 1:
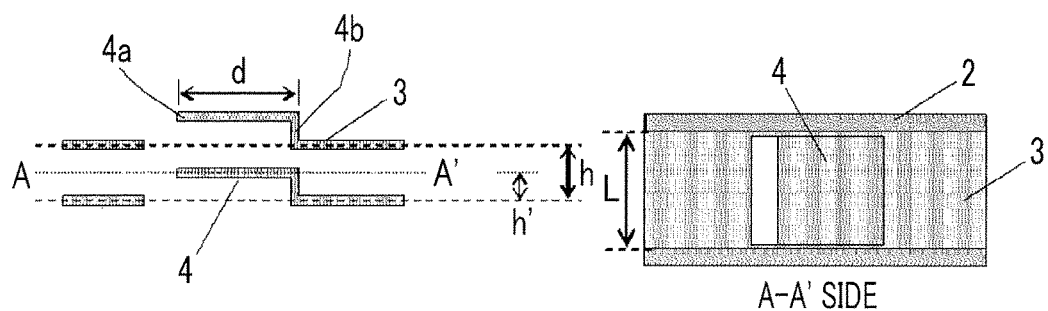
FIG. 1 is a conceptual diagram showing an example of a baffle part provided in a plate-like catalyst element according to the present invention.

In the top plate and the leg plate, the length (width) of the spacer part in a direction orthogonal to the lengthwise direction is preferably 10% to 95% and more preferably 30% to 80% with respect to the width L of the flat part 3 between the spacer parts. In FIG. 1, one baffle part having substantially the same width as the width L of the flat part 3 is provided. However, the baffle part can be divided into two pieces in the middle in the width direction and the two baffle parts can be provided with an interval therebetween. When the plate-like catalyst elements are superimposed, the spacer part of an adjacent plate-like catalyst element can be fitted into the section having the interval. In the plate-like catalyst element shown in FIG. 1, the width of the top plate is the same as the width of the leg plate. However, the width of the top plate may be larger than the width of the leg plate or contrarily, the width of the top plate may be smaller than the width of the leg plate.

The baffle parts are preferably disposed in the flat part at an interval of 3 cm to 10 cm in the lengthwise direction of the spacer part.

Figure 3:
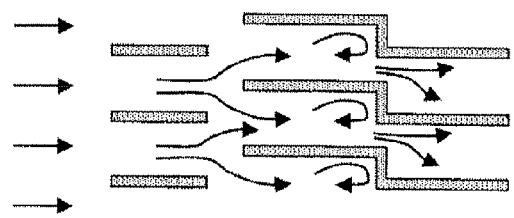
FIG. 3 is a conceptual diagram showing gas flow in a catalyst structure which is an example of the present invention.

In addition, the flat part preferably has a hole passing through the flat part from the front surface to the rear surface in the section having the baffle part. In the element shown in FIG. 1, a complementary through-hole may be provided in the baffle part. When the baffle part and the through-hole are provided, it is assumed that the gas flows as shown in FIG. 3.

Figure 2:
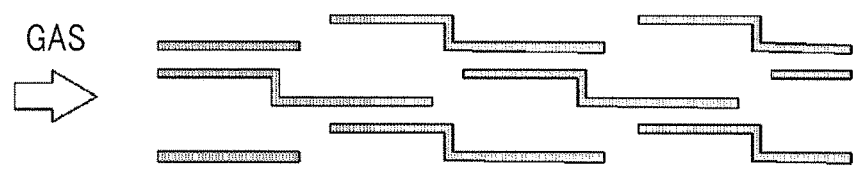
FIG. 2 is a diagram showing a laminated structure of a catalyst element according to an example of the present invention.
Figure 2:
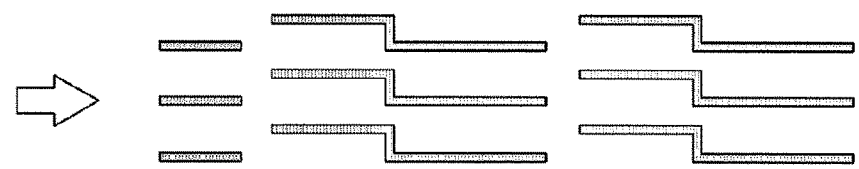
Figure 2:
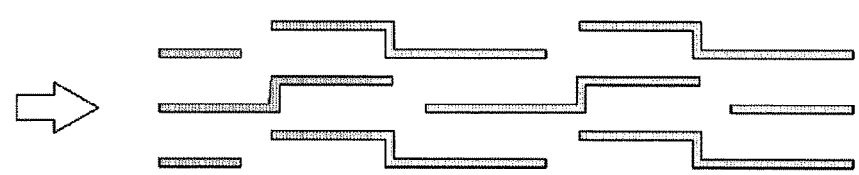

A baffle part in one plate-like catalyst element is preferably arranged at the same position as that of a baffle part in an adjacent superimposed plate-like catalyst element as viewed from the direction normal to the flat part. Further, as shown in FIG. 2(b), the direction of the baffle part in one plate-like catalyst element may be the same as the direction of the baffle part in an adjacent superimposed plate-like catalyst element or as shown in FIG. 2(c), the direction of the baffle part in one plate-like catalyst element may be opposite to the direction of the baffle part in an adjacent superimposed plate-like catalyst element.

The flat plate-like catalyst element 1 has a base (base for forming the flat part, the spacer part, and the baffle part) and a layer including a catalyst component supported by the surface of the base (hereinafter, referred to as a catalyst layer in some cases). As the base, a metal lath plate, a net-like object made of a twisted yarn of inorganic fiber such as glass fiber, a net-like woven cloth made of a twisted yarn of E glass fiber, and the like may be used. The thickness of the base is not particularly limited and is preferably 0.1 mm to 0.3 mm.

The catalyst component is not particularly limited as long as the component promotes removal of nitrogen oxides. Examples of the catalyst component include ones obtained by arbitrarily combining elements such as titanium, iron, vanadium, molybdenum, and tungsten. In application of the catalyst component to the base, a paste composition containing the catalyst component (hereinafter, referred to as a catalyst paste in some cases) can be used. The application method of the catalyst component to the base is not particularly limited. Examples thereof include a method of placing a catalyst paste on a surface of a flat metal lath plate and pressing the paste with a roller or the like, and a method of applying a catalyst paste on a surface of a flat base of a woven cloth made of glass fiber, sandwiching the paste to be interposed between two sheets of bases by placing another flat base of a woven cloth made of glass fiber on the surface to which the catalyst paste is applied, applying the catalyst paste to both sides of the superimposed base as necessary, and then strongly compressing the paste and the bases by a roller or the like so that the bases are impregnated with the catalyst paste. The flat plate-like catalyst obtained as described above has a structure in which catalyst layers are laminated on both sides of the flat base. The mesh of the base is preferably filled with the catalyst paste.

Figure 4:
FIG. 4 is a diagram showing an example of the shape of the baffle part provided in the plate-like catalyst element according to the present invention.
Figure 4:
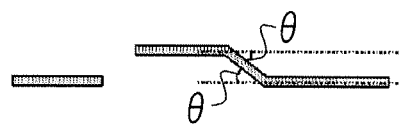
Figure 4:
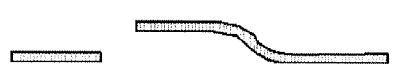

The spacer part and the baffle part of the plate-like catalyst element are formed in the following manner. The spacer part having a wavy cross section can be formed by subjecting a flat base formed by laminating the catalyst paste to a press bending process. In addition, a U-shaped cut can be formed by a press cutting process and also the cut part can be bent by the press bending process as shown in FIG. 4 to form a baffle part. In the above-described press process, the temperature is suitably 120° C. to 300° C. When the temperature is within the above range, moisture in the catalyst paste applied during the press process evaporates and the catalyst component is solidified on the base. When the temperature during the press process is too low, the moisture is not likely to evaporate sufficiently. When the temperature during the press process is too high, the moisture in the surface part evaporates too quickly and thus the baffle part is not likely to be formed. The plate-like catalyst element obtained in the above manner can be appropriately cut into a size than can be put in a frame 5.

[Catalyst Structure]

The catalyst structure according to an embodiment of the present invention is formed by superimposing plural sheets of plate-like catalyst elements. The superimposed flat plate-like catalyst elements can be put in the frame 5 such that superimposed catalyst elements do not collapse. The method of superimposing the plate-like catalyst elements is not particularly limited as long as the method can ensure a space through which gas passes between the plate-like catalyst elements. The spacer parts having a wavy cross section may be superimposed to be parallel to each other, may be superimposed at a right angle, or may superimposed at an angle between a straight angle and a right angle. In the present invention, as shown in FIG. 6, the spacer parts are preferably superimposed parallel to each other. Further, when the spacer parts are superimposed so as to be fitted, that is, the spacer part in one catalyst element is superimposed to be in contact with the flat part in an adjacent catalyst element, this structure is preferable from the viewpoint of obtaining a high aperture ratio and high denitrification efficiency. The number of the sheets of the catalyst element to be superimposed can be appropriately set according to the size of the frame and the size of the plate-like catalyst element. The number of the sheets of the catalyst element to be superimposed is typically about 20 to 40. The frame is not particularly limited as long as the frame has a structure of introducing gas between the superimposed plate-like catalyst elements. For example, the frame 5 may be a square cylindrical frame composed of four metal flat plates.

A method of cleaning exhaust gas according to the present invention includes causing the catalyst structure for exhaust gas cleaning according to the present invention to make exhaust gas flow into a structure along the lengthwise direction of the spacer part. When the catalyst structure of the invention is used, turbulence is effectively imparted to the gas flowing in the flow channel by the baffle part with a small pressure loss and thus the denitrification efficiency is very high.

EXAMPLES

Next, the present invention will be described in more detail with reference to examples. However, the present invention is not limited to these examples.

Example 1

Figure 5:
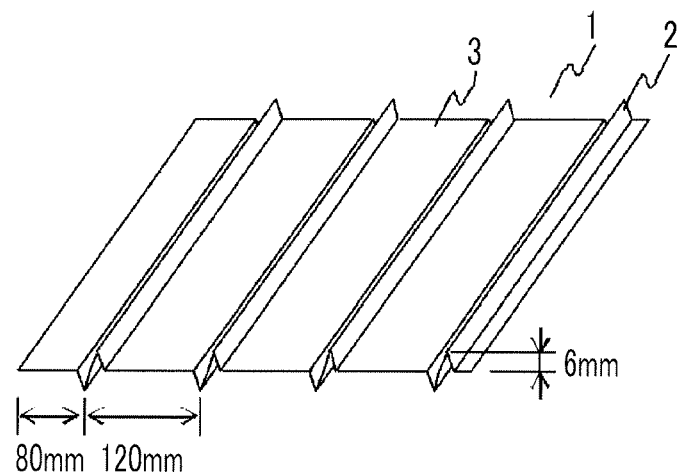
FIG. 5 is a diagram showing the shape and the size of the plate-like catalyst element (without showing the baffle part).

10 kg of titanium oxide, 2 kg of ammonium molybdate $((NH_4)_6.Mo_7O_{24}.4H_2O)$, 1 kg of ammonium metavanadate, and 1 kg of oxalic acid were mixed and kneaded by a kneader for 1 hour while water was added to obtain a paste. Then, 2 kg of silica-alumina-based inorganic fiber was added to the paste and the mixture was further kneaded for 30 minutes to obtain a catalyst paste with a water content of about 30%. The obtained paste was applied to the mesh and surface of a long strip-like metal lath base having a width of 500 mm, made of SUS430, prepared in advance using a pair of rolling rollers, and thus a flat plate-like catalyst element having a long strip shape and a thickness of 0.7 mm was obtained. As shown in FIG. 5, after wavy spacer parts (height h=6 mm) were formed using a pressing machine in the catalyst element, a plate-like catalyst having a long strip shape was obtained. After that, the plate-like catalyst having a long strip shape was cut to a width of 150 mm and length of 600 mm and a catalyst element (1) was obtained. The catalyst element (1) was subjected to a press process using a processing die and a reversed L-shaped baffle part was formed in the flat part of the element as shown in FIG. 1. Thus, a catalyst element (2) was obtained. The baffle part had a width of 40 mm, a height of 3 mm (h/2), and a top plate length d of 20 mm, and was disposed at an interval of 50 mm in the flow channel direction. Twelve sheets of the obtained catalyst elements (2) were superimposed to have a structure shown in FIG. 2 and the superimposed catalyst elements were put in a frame to prepare a catalyst unit A having a size of 150 mm square and a length of 600 mm. The catalyst unit A was air-dried for 24 hours and then the catalyst unit was fired at 500° C. for 2 hours while air was caused to flow. The gas was caused to flow in the direction shown in FIG. 2(a).

Example 2

A catalyst unit B in which the directions of the baffle parts formed in each catalyst element, which was formed by superimposing the catalyst elements (2) obtained in Example 1 as shown in FIG. 2(b), were the same was prepared. The gas was caused to flow in the direction shown in FIG. 2(b).

Examples 3 and 4

Catalyst units C and D were prepared in the same manner as in Example 2 except that the top plate length d of the reversed L-shaped baffle part was respectively changed to 10 mm and 30 mm.

Example 5

A catalyst unit E in which the directions of the baffle parts formed in each catalyst element, which was formed by superimposing the catalyst elements (2) obtained in Example 1 as shown in FIG. 2(c), were opposite to each other was prepared. The gas was caused to flow in the direction shown in FIG. 2(c).

Example 6

A catalyst unit F was prepared in the same manner as in Example 2 except that the shape of the baffle part was changed to a shape bent at an angle θ of 40° as shown in FIG. 4(b) (top plate length d=20 mm).

Comparative Example 1

A catalyst unit G was prepared in the same manner as in Example 1 except that the catalyst element (2) was changed to the catalyst element (1) prepared in Example 1.

Comparative Example 2

Figure 7:
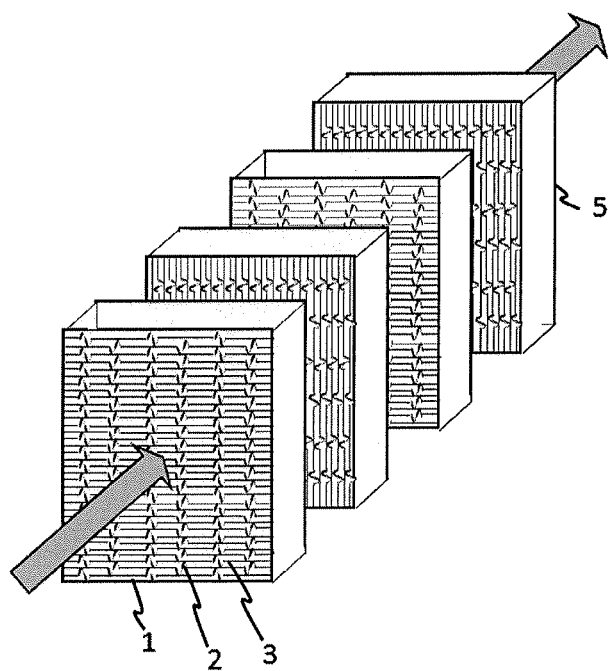
FIG. 7 is a diagram showing an arrangement example of a catalyst structure of the related art in which the catalyst structures formed by laminating short plate-like catalysts are provided in plural stages in a gas flowing direction.

The catalyst element (1) having a length of 600 mm prepared in Example 1 was cut to have a length of 50 mm and the cut catalyst elements were superimposed and put in the frame to prepare twelve catalysts unit having a size of 150 mm square and a length of 50 mm. The elements were arranged at an equal interval of 2 cm in series as shown in FIG. 7 to prepare a multistage catalyst structure H.

Comparative Example 3

A catalyst element (3) in which the top plate of the baffle part in Example 1 was removed (d=0 mm) and weir-like protrusions having a width of 40 mm and a height of 3 mm were disposed at an interval of 50 mm was prepared. A catalyst unit I was prepared in the same manner as in Example 1 except that the catalyst element (2) was changed to the catalyst element (3).

The catalyst units A to I obtained in the above Examples and Comparative Examples were subjected to a denitrification under the conditions shown in Table 1 and the denitrification rate and the pressure loss were measured. The results are shown in Table 2.

As shown in Table 2, for the catalyst unit G (Comparative Example 1), the ventilation loss is small but the denitrification performance is significantly low. The denitrification performance of the multistage catalyst structure H (Comparative Example 2) is improved to about 1.2 times that of the denitrification performance of the catalyst unit G, but is not sufficient.

Contrarily, the denitrification performance of the catalyst units A to F (Examples 1 to 6) is high compared to the catalyst unit G and the multistage catalyst structure H. Specifically, the denitrification performance of the catalyst units A to F (Examples 1 to 6) is improved to about 1.6 times to 1.7 times that of the denitrification performance of the catalyst unit G. Particularly, compared to the catalyst unit I (Comparative Example 3) in which the weir-like protrusions without the top plate are disposed, while the pressure loss is at almost the same level, the degree of improvement in denitrification performance is high.

As seen from the results, the baffle part, composed of the top plate and the leg plate, provided in the catalyst element according to the present invention contributes to improvement in denitrification performance.

Further, for the catalyst units B and E (Examples 2 and 5) in which the baffle part in one plate-like catalyst element is arranged at the same position as that of the baffle part in an adjacent superimposed plate-like catalyst element as viewed from the direction normal to the flat part, the pressure loss is small compared to the catalyst unit A (Example 1) and thus the structure of the catalyst units is effective. In addition, the catalyst unit composed of the catalyst elements (Example 6) in which the baffle parts are erectly provided to be inclined to the leg plate as shown in FIG. 4(b) is effective since the pressure loss can be decreased while the denitrification performance is maintained at a high level.

TABLE 1

| Item | Numerical Value |
| --- | --- |
| 1. Gas Composition | |
| $NO_x$ | 80 ppm |
| $NH_3$ | 96 ppm |

TABLE 1-continued

| Item | Numerical Value |
| --- | --- |
| $O_2$ | 14% |
| 2. Gas Flow Rate | 7 m/s |
| 3. AV (catalyst area velocity) | 50 m/h |
| 4. Temperature | 350° C. |
| 5. Exhaust Gas Type | LPG Combustion Exhaust Gas |

TABLE 2

| Classification | Denitrification Rate (m/h) | Ventilation Loss (mmH$_2$O/m) |
| --- | --- | --- |
| Example 1 | 103 | 70 |
| Example 2 | 104 | 60 |
| Example 3 | 100 | 54 |
| Example 4 | 107 | 65 |
| Example 5 | 105 | 59 |
| Example 6 | 102 | 45 |
| Comparative Example 1 | 61 | 20 |
| Comparative Example 2 | 73 | 30 |
| Comparative Example 3 | 85 | 70 |

REFERENCE SIGNS LIST

1: Plate-like catalyst element
2: Spacer part
3: Flat part
4: Baffle part
4a: Top plate
4b: Leg plate
5: Catalyst structure (catalyst unit)

The invention claimed is:

1. A catalyst structure for cleaning exhaust gas, the catalyst structure comprising:
flat plate-like catalyst elements, wherein each of the flat plate-like catalyst elements is composed of a flat part, which is a main structural part, and a linear spacer part composed of raised strips and recessed strips,
wherein the flat plate-like catalyst elements are superimposed so that a gas flow channel is ensured along a lengthwise direction of the linear spacer part,
wherein the flat part has at least one baffle part composed of a leg plate erectly provided on the flat part with a height that is less than that of the spacer part with reference to the flat part, and a top plate disposed substantially parallel to the flat part from the upper end of the leg plate,
whereby turbulence can be imparted by the baffle part to gas that flows in the gas flow channel.

2. The catalyst structure according to claim 1, wherein a baffle part in one plate-like catalyst element is arranged at the same position as that of a baffle part in an adjacent superimposed plate-like catalyst element as viewed from a direction normal to the flat part.

3. The catalyst structure according to claim 1, wherein the direction of the baffle part in one plate-like catalyst element is the same as the direction of the baffle part in an adjacent superimposed plate-like catalyst element.

4. The catalyst structure according to claim 1, wherein the direction of the baffle part in one plate-like catalyst element is opposite to the direction of the baffle part in an adjacent superimposed plate-like catalyst element.

5. The catalyst structure according to claim 1, wherein the flat part has a hole passing through the flat part from the front surface to the rear surface in a section having the baffle part.

6. The catalyst structure according to claim 1, wherein the height of the top plate with reference to the flat part is ⅖ to ⅗ of the height of the spacer part with reference to the flat part.

* * * * *